UNITED STATES PATENT OFFICE.

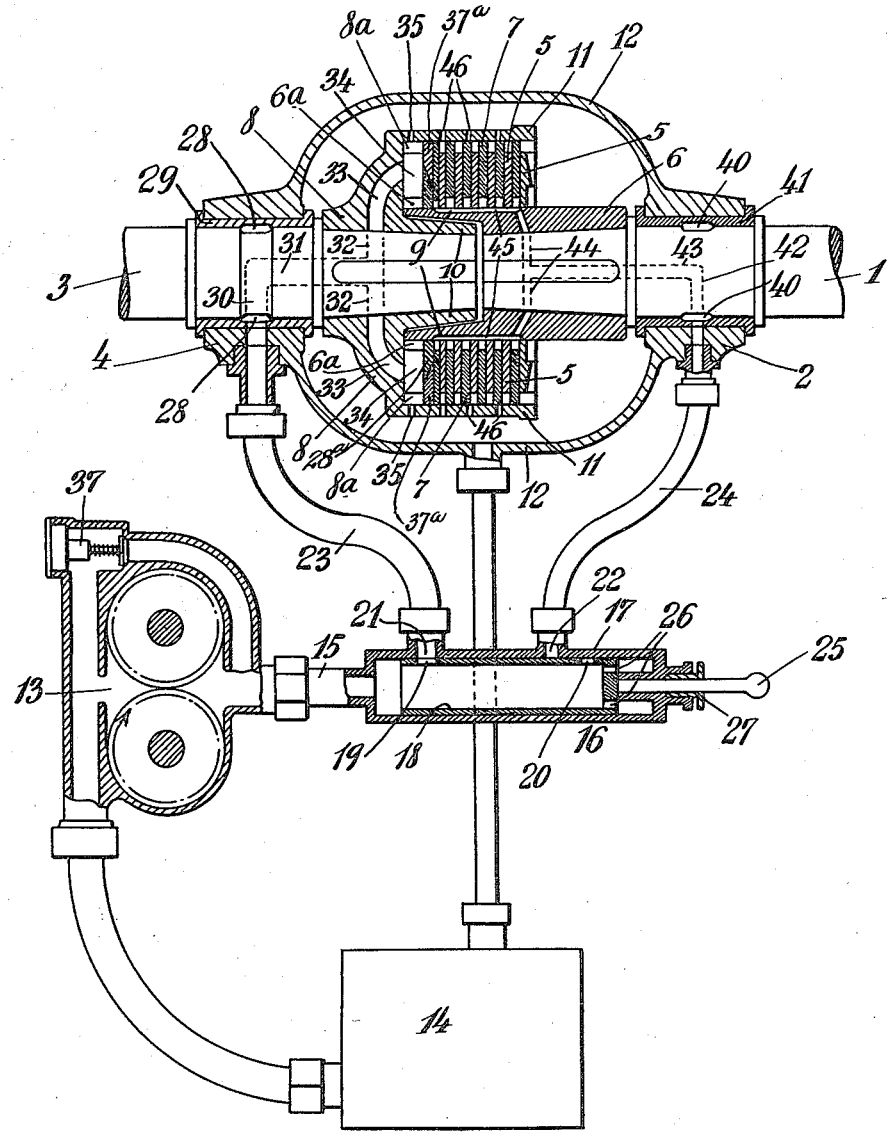

GUIDO FORNACA, OF TURIN, ITALY.

FRICTION-CLUTCH.

1,138,099.   Specification of Letters Patent.   Patented May 4, 1915.

Application filed October 17, 1912. Serial No. 726,234.

*To all whom it may concern:*

Be it known that I, GUIDO FORNACA, a subject of the King of Italy, residing at Turin, Italy, have invented certain new and useful Improvements in Friction-Clutches, of which the following is a full, clear, and exact specification.

This invention relates to friction clutches.

More particularly, this invention relates to friction clutches controlled by a fluid under pressure. Preferably, the driven shaft is coupled to the driving shaft through a friction clutch comprising a clutch member secured to the driven shaft and carrying one or more disks, and a second clutch member secured to the driving shaft and carrying also one or more disks so arranged with respect to the first named plurality of disks whereby the fluid under pressure causes an engagement between the disks and thereby couples the driven shaft to the driving shaft. My arrangement also contemplates the disconnection of the driven shaft from the driving shaft by means of a fluid under pressure to disengage the respective disks carried by the clutch members, and thus uncouple the driven shaft.

Other features of my invention will be more fully understood from the following description, and the accompanying drawing which illustrates partly in elevation, but largely in central vertical section, a friction clutch constructed and operated in accordance with my invention.

Referring to the figure, the driving shaft 1 journaled in bearing 2 is shown arranged in alinement with the driven shaft 3 journaled in bearing 4, the friction clutch being disposed proximate the adjacent ends of the said shafts. The friction clutch comprises disks 5 carried by the hub 6 wedged on the driving shaft 1, but axially slidable on the keys 6ᵃ on hub 6, excepting the extreme right-hand or outermost disk which is keyed to the hub 6; the disks 7 axially slidable on keys 8ᵃ are carried by the hub 8 wedged on the driven shaft 3, the disks 7 being disposed between the disks 5, preferably by arranging the disks 5 and 7 alternately. The extreme left-hand disks 28ᵃ, 37ᵃ overlap each other as shown, so as to be in the same plane, but they in effect constitute an actuating piston for forcing all of the disks against the stationary abutment disk 5 rigidly keyed to the shaft 6 at the extreme right. The extreme left-hand disks have to be separate in order that the necessary slip between the driving and driven elements can take place. The hub 6 has a portion 9 of relatively large diameter projecting beyond the end of the driving shaft 1 and embracing the end portion of the driven shaft 3. The hub 8 has a part 10 within the said projecting portion 9 of hub 6 but spaced therefrom; the hub 8 has further an outer part 11 of relatively much larger diameter embracing the said portion 9 of hub 6 and extending to a desired point beyond the end of the driven shaft 3 and about the end portion of driving shaft 1. Preferably, the disks 5 and 7 are circular and extend a complete circumference; however, the shape of the same may be varied according to circumstances, as will be readily understood.

The clutch as a whole is inclosed in a fluid tight casing or cover 12. By the employment of suitable fluid conducting means a fluid under pressure is so applied to cause the disks 5 and 7 to be brought into mutual frictional engagement, whereby the driven shaft 3 is connected to the driving shaft 1; the disconnection of the driven and driving shafts is effected by the provision of suitable fluid conducting means for separating the disks carried by the driven shaft out of contact with the disks carried by the driving shaft. One method of supplying and controlling the fluid is illustrated in the figure. The pump 13, shown as of the rotary type, forces the water or other incompressible fluid from the reservoir 14 through the pipe 15 into the controlling valve 16. The valve 16 comprises a fixed outer cylindrical casing 17 inclosing a slide valve member 18 having valve openings 19 and 20 adapted to register respectively with the openings 21 and 22 of pipes 23 and 24, when the valve member 18 is moved by the control rod 25 to the proper positions. The position of the valve member 18 shown is the extreme right-hand position of the same, under which conditions the clutch members will be locked, thereby connecting the driven shaft 3 with the driving shaft 1. When the valve member 18 is moved sufficiently to the left, the valve opening 20 will register with the opening 22 of pipe 24, whereupon the clutch members will be uncoupled, and the driving shaft will run idly. For the purpose of securing balanced conditions for the several positions of the valve member 18, the same is perforated at 26.

When the control rod 25 is moved to cause the valve member 18 to assume the position indicated in the drawing, the water or other fluid will pass through pipe 23 into the ring passage 28 formed about the periphery of the driven shaft 3 within the bearing 4, and bounded on the outside by the bearing ring 29; the fluid will then traverse the transverse passage 30 disposed in the driven shaft 3, then flow through longitudinal passage 31 and transverse passages 32, also disposed in the driven shaft 3, thence into the diverging passages 33 in the hub 8, and finally into the annular compartment 34 of the clutch, the pressure of the fluid causing the disks 5 and 7 to move axially toward the right into frictional contact with one another, and causing the clutch members to be coupled, the fluid during such action flowing out of the annular compartment 34 through openings 35 in the outer part 11 of hub 8 into the casing 12, and flowing by the return pipe 36 back into the reservoir 14, to be again pumped along the path just described. The total area of the openings 35 must be so related as to produce the desired static pressure on the disks of the clutch to effect the desired degree of engagement.

It is desirable that the pump 13 exert a substantially constant pressure throughout the operation of the clutch, and for this purpose I have secured beneficial results by means of the spring pressed valve 37 disposed in the by-pass between the inflow and outflow ports of the pump. The pump 13 is driven by any suitable means, and may be geared to the driving shaft 1, or otherwise actuated by the engine or other prime mover.

In order to release the clutch the valve member 18 is moved to the left, bringing the valve opening 20 in register with the opening 22, whereby the water or other fluid will flow through pipe 24, into the ring passage 40 formed about the periphery of the driving shaft 1 within the bearing 2, and bounded on the outside by the bearing ring 41; the fluid will then flow through the transverse passage 42, disposed in the driving shaft 1, thence through longitudinal passage 43 and transverse passages 44, also disposed in the driving shaft 1, thence into the annular compartment 45 at the periphery of the hub 6, thence between each disk 5 and adjacent disk 7, thence through openings 46 in the outer part 11 of hub 8, thence into the casing 12, and finally through return pipe 36 and into the reservoir 14, to be again circulated by the pump 13 about the course just described. It will be noted that when the clutch members are uncoupled by moving the disks to the left, the frictional interference between the relatively movable parts of the clutch is substantially *nil*. The total area of the openings 46 will be such as to secure the necessary static pressure exerted by the fluid to effect disengagement of the disks of the respective sets carried by the clutch members.

It will be seen from the above that the control valve may be disposed at any desired point with respect to the clutch proper, or the fluid reservoir, or the pump. It will be understood that proper precautions for securing fluid tight joints between the parts will be taken, my construction readily admitting of substantially fluid tight connections. By my arrangement, practically instantaneous coupling or uncoupling of the clutch members is secured upon manipulating the control valve to the proper position. It will be also seen that the wearing parts are simply arranged, and permit of ready replacement.

Although I have illustrated my invention in merely one form thereof, it will be clear that many changes and modifications may be made in the specific arrangement shown without departing from my invention.

Having thus described my invention, I declare that what I claim as new and desire to secure by Letters Patent, is:—

1. A clutch comprising in combination a plurality of clutch members, a set of movable elements carried by one of said clutch members, a second set of movable elements carried by another of said clutch members, and means for applying a fluid under pressure to cause said sets of movable elements to come in frictional engagement to clutch said clutch members and for separating the movable elements of said sets from one another to unclutch said clutch members.

2. A clutch comprising in combination a clutch member, a set of disks carried thereby, a second clutch member, a set of disks carried thereby, certain of the disks of said first set being disposed between and contiguous to certain of the disks of said second set, and means for applying a fluid under pressure and under circulation to cause the disks of said sets to come into engagement to close said clutch members and for causing the fluid to flow between the contiguous disks of said sets to separate the same to unclutch said clutch members.

3. A clutch comprising in combination a clutch member, a set of disks movably mounted thereon, a second clutch member, a set of disks movably mounted thereon, certain of the disks of said second set being disposed between certain of the disks of said first set and adapted to come in frictional contact therewith, and means for spplying a fluid under pressure and under circulation to cause the disks of said sets to come in frictional contact to clutch said clutch members and to cause the fluid to circulate between the disks of said sets to maintain said clutch members in unclutched position.

4. The combination with a driving shaft and a driven shaft and journals therefor, of a clutch member secured to said driving shaft, a set of axially movable elements carried by said clutch member, a second clutch member secured to said driven shaft, a plurality of axially movable elements carried by said second clutch member, certain of said second set of axially movable elements being interposed between certain of said first set of axially movable elements and adapted when moved to be brought in frictional contact with one another, and means for applying a fluid under pressure and under circulation to cause axial movement of said movable elements to bring the same in frictional contact to clutch said clutch members and to cause the fluid to flow between and separate the contiguous movable elements to unclutch said clutch members.

5. The combination with a plurality of coöperating clutch members and sets of friction disks carried thereby, of means for applying a fluid under pressure and under circulation to bring said movable elements in frictional contact to clutch said clutch members and to cause the fluid to circulate between contiguous disks to maintain said clutch members in unclutched position, said means comprising a pump for impressing a certain pressure on the fluid and means for controlling said impressed pressure.

6. The combination with a plurality of coöperating clutch members and sets of friction disks carried thereby, of means for applying a fluid under pressure and under circulation to bring said movable elements in frictional contact to clutch said clutch members and to cause the fluid to circulate between contiguous disks to maintain said clutch members in unclutched position, said means comprising a pump for impressing a certain pressure on the fluid and means for controlling said impressed pressure, said last named means including a valve provided with a movable valve element having means for maintaining said valve element in balanced condition.

7. The combination of a driving shaft, a driven shaft, bearings for said shafts, coöperating clutch members and friction elements, and means for applying a fluid under pressure and circulation to cause said friction elements to frictionally engage one another to couple said clutch members and to cause fluid to flow between and separate said friction elements to uncouple said clutch members, said last named means including passages extending parallel to the axes of the driving and driven shafts and a fluid passage passing through at least one of said bearings.

8. A friction clutch comprising in combination a clutch member, a plurality of disks carried thereby, a second clutch member, a plurality of disks carried by said second named clutch member, said disks being mounted on the respective clutch members to move axially and means for applying a fluid under pressure to cause said disks to move either away from or toward and in contact with one another, thereby uncoupling or coupling at will said clutch members.

9. In a friction clutch, the combination with a plurality of clutch members and one or more disks carried by each of said clutch members, said disks being mounted to move toward each other into physical contact, of means for applying a fluid to move said movable elements in either one or two directions of movement, said means comprising a pump and a system of fluid conveying means through which the fluid is circulated by said pump.

10. A multiple disk clutch comprising a driving member carrying a plurality of slidable disks, a driven member carrying coöperating disks alternating with said driving disks, an abutment carried by one member for limiting the movement of said disks in clutching said shafts, an opposite movable piston for moving said disks, a fluid pressure connection to said piston, a fluid pressure passage for admitting fluid pressure between said disks, a valve movable to control one or the other of said passages, a source of fluid pressure connected to said valve, and a fluid pressure retaining casing.

In testimony whereof I affix my signature in presence of two witnesses.

GUIDO FORNACA.

Witnesses:
   JOCELYN GONBEYRON,
   TENO MENOTTO.